C. H. DESAUTELS.
STEAM CONNECTION FOR COLLAPSIBLE CORES.
APPLICATION FILED FEB. 18, 1921.

1,434,431.

Patented Nov. 7, 1922.

INVENTOR
Charles H. Desautels.
BY
ATTORNEY

C. H. DESAUTELS.
STEAM CONNECTION FOR COLLAPSIBLE CORES.
APPLICATION FILED FEB. 18, 1921.

1,434,431.

Patented Nov. 7, 1922.

INVENTOR
Charles H. Desautels.
BY
Edward C. Taylor
ATTORNEY

Patented Nov. 7, 1922.

1,434,431

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

STEAM CONNECTION FOR COLLAPSIBLE CORES.

Application filed February 18, 1921. Serial No. 446,035.

*To all whom it may concern:*

Be it known that I, CHARLES H. DESAUTELS, a citizen of the United States of America, residing at Springfield, in the county of Hampden and State of Massachusetts, have invented certain new and useful Improvements in Steam Connections for Collapsible Cores, of which the following is a specification.

My invention relates to a collapsible core and more particularly to fluid connecting means for collapsible cores of the type in which a fluid, usually steam, is circulated through the several core sections so that heat may be applied internally to a tire casing mounted on the core.

One principal object of my invention is to provide an improved means or device for fluid to pass from section to section of a collapsible core. My improved means is designed so as to make the desired connections between sections more conveniently than heretofore and to make the connections without in any way interfering with the assembly of the core sections. By so constructing the device that the core sections may be assembled and held in their true ring form before the fluid connections between them are made by my device the addition of the latter to the core will not in any way interfere with the desired and important assembly of the core into the proper ring form. Furthermore the device is so made that the steam or fluid in passing from one section of the core to another passes the only joints between the device and the core sections at remote points from a tire carcass on the core. Thus if due to any carelessness or lack of skill in assembling the core sections or the device for making the connections between them for the passage of fluid there is a leak in the system there is no possibility at all of the fluid getting between the core and a tire carried thereon.

A further object of my invention is to provide a simple, easily applied steam connection between sections for this type of core; to provide a convenient steam connection in which the steam joints present the minimum tendency to become leaky; to provide a connection which can readily be applied to standard types of cores whether or not these cores were designed for the purpose of internal heating; and to provide a connection which can readily be removed from the core after the internal heating of the tire casing has been completed so that further operations may be performed upon the casing without interference from the steam connection. Other objects of the invention will appear in the detailed description of a preferred form of the invention and in the annexed claims.

To accomplish the objects of my invention I have devised the type of device or connection for attachment to the core which I will now describe in its preferred form in connection with the accompanying drawings, in which.

Figure 1:
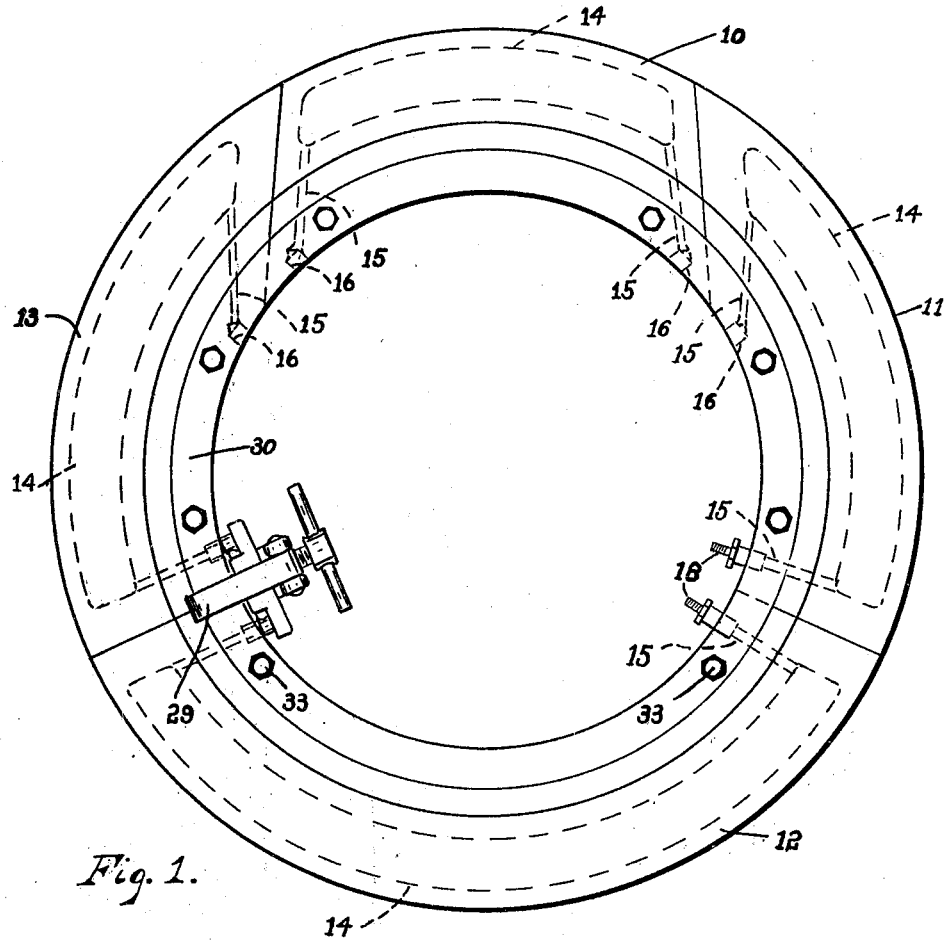
Fig. 1 is a view of a collapsible core having provision for the circulation of steam throughout the several sections, only one of the connections being shown in position.
Figure 2:
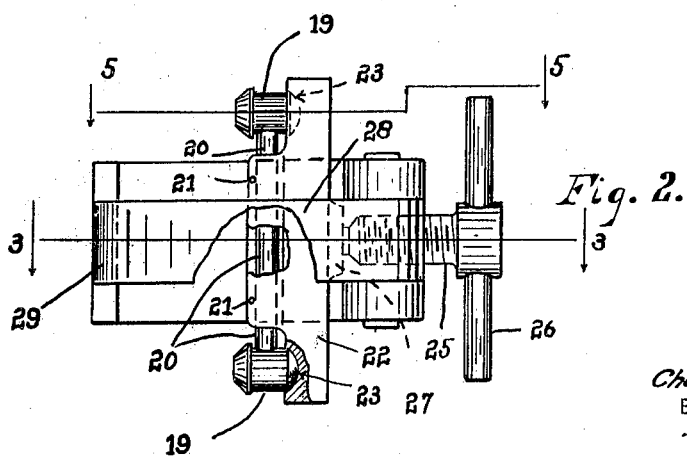
Fig. 2 is a detail view of one of the connections removed from the core.

Referring first to Fig. 1, I have shown a collapsible core having sections 10, 11, 12, and 13, each of which has an internal chamber 14 having a passage 15 at each end extending toward the inner circumference of the core. These passages terminate at the inner circumference of the core in sockets 16, provided with bushings 17 (adapted to form steam tight connections with plugs or nipples to be described later) except that in the case of core sections 11 and 12 the adjacent passages 15 are provided with connections 18 whereby the steam may be admitted and withdrawn from the chambers.

Figure 3:
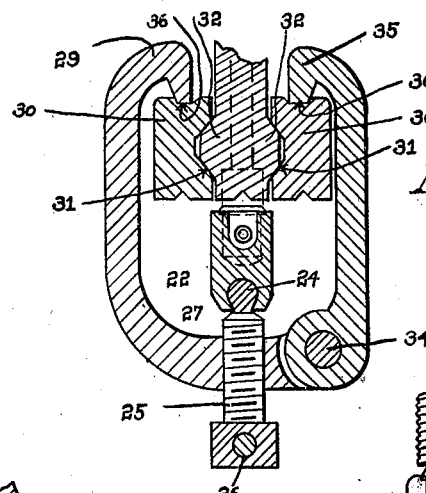
Fig. 3 is a section on line 3—3 of Fig. 2, but in addition showing parts of a core with the connection applied to that type of core in which the sections are held in position by opposed clamping rings.
Figure 4:
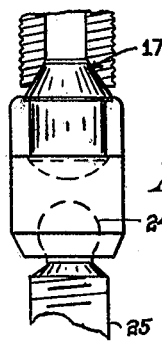
Fig. 4 is a detail view showing the steam or fluid joint at the point of connection with one of the core sections.

In order to obtain circulation of steam throughout the several sections it is necessary to connect adjacent passages 15 together. For this purpose I provide adjacent connections having plugs or nipples 19 adapted to fit into sockets 16. These nipples are connected together by a pipe 20 preferably made of flexible material such as copper tubing. The pipe 20 made of suitable copper tubing will give the desired flexibility but if desired it may be made of any other flexible means as a hose fixed at the ends to form a passage between nipples 20. This pipe is mounted loosely as by pins 21 in a forked extension of a bridge member 22. The latter is provided with spherical bearing 23 for the rear end of the nipples 19. Fitting into a spherical seat in the bridge piece or yoke is the spherical end 24 of a screw 25 provided with a handle 26 by which it may be rotated. The spherical end 24 of this screw is held in position by a cap 27 secured in any suitable way to the bridge member 22. Screw 25 passes through a member 28 having a hook 29 constructed to fit over the top of one of the opposed rings 30 Fig. 3 which serve to hold the core sections in their assembled relation. To this end, as is well known, the opposed rings 30 are provided with bridge portions 31 fitting over a bulbed part 32 on the inner portion of the core sections. The two rings are held together by bolts 33 passing through suitable openings in the rings and core as is well known. Pivoted at 34 to the member 28 is another hook 35 fitting over the opposite ring 30. The rings 30 preferably have grooves 36 to receive the ends of the hooks.

In applying this connection the nipples 19 are placed in position in adjacent sockets 16, the hooks 29 and 35 engaged upon the rings 30, and screw 25 tightened into the bridge member 22 forces the nipples firmly into position. Since the nipples themselves have spherical seats 23 and since the pipe 20 is flexible enough for the purpose the nipples can readily accommodate themselves to the sockets 16. The spherical universal joint 24 between the screw 25 and the bridge member 22 allows this accommodation to take place without affecting the hooks 29 and 35 or being affected thereby. By this construction properly applied slight inequalities in the core segments and wear on the joints themselves will readily be taken care of and a tight steam connection insured. Furthermore, if for any reason at all any particular joint becomes leaky it will and can readily be detected and tightened.

Figure 5:
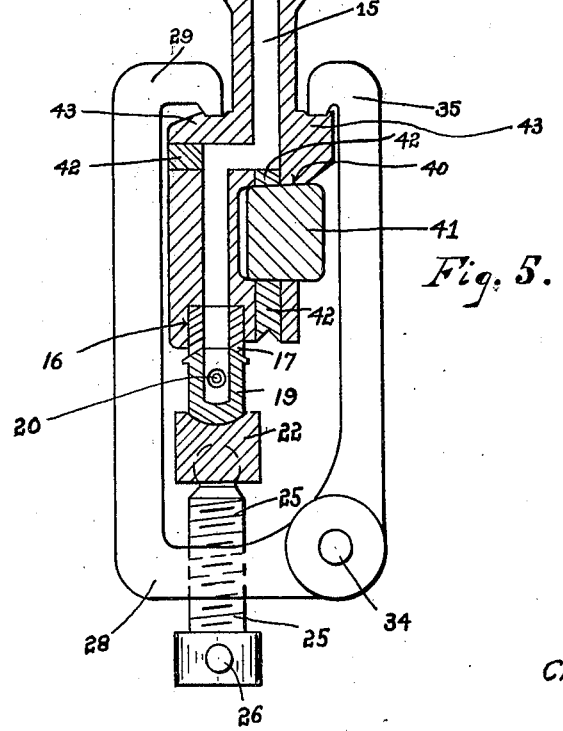
Fig. 5 is a section on line 5—5 of Fig. 2, but in addition showing parts of a core with the connection applied to that type of core (known as the Simplex core) in which the sections are held in assembled position by a tapered ring fitting in a tapered slot continuous throughout the several sections.

In Fig. 5, I have illustrated the connection adapted to a slightly different type of core. Instead of opposed rings being bolted together to hold the core sections in assembled relation the sections have a tapered groove 40 which is continuous on the same radius around the several sections. When the latter are assembled a tapered ring 41 is driven into groove 40 to hold the core sections in assembled position. The core sections can be readily disassembled by knocking out ring 41 from the side of the core opposite groove 40 through a suitable opening for the purpose. In applying the connection to such a core the passage 15 has to pass around the groove 40 and it has been shown in the figure as having been drilled in this position, the drilled holes being plugged when necessary with plugs 42 to provide a tight passage 15 down to the socket 16. The general form of connection is the same in this case as in the other, the proportion of the elements being slightly modified to fit the different contour of the core and the core itself being provided with shoulders 43 or other suitable means to receive the ends of hooks 29 and 35.

It will readily be understood that this connection may be modified to accommodate itself to different styles of collapsible cores without departing from the invention as set forth in the appended claims and that in like manner changes may be made in the design of the connection itself.

Having thus described my invention I claim:

1. A collapsible core comprising in combination a plurality of sections which together form a core ring, said sections provided with chambers for temperature controlling fluid, means to hold said sections together in ring form, and means to connect the chambers of said sections independently of the first mentioned means.

2. A collapsible core comprising in combination a plurality of sections which together form a core ring, said sections provided with chambers for temperature controlling fluid, means to hold said sections together in ring form, and means located on the inner periphery of the core ring to connect the chambers of said sections independently of the first mentioned means.

3. A collapsible core comprising in combination a plurality of sections which together form a core ring, said sections provided with chambers for temperature controlling fluid, means located inwardly of the working surface of the core to hold said sections together in ring form, and means located on the inner periphery of the core ring to connect the chambers of said sections independently of the first mentioned means.

4. A collapsible core comprising in combination a plurality of sections which together form a core ring, said sections provided with chambers for temperature controlling fluid, means to hold said sections together in ring form, and means arranged for radial application to the core ring to connect the chambers of said sections independently of the first mentioned means.

5. A collapsible core comprising in combination a plurality of sections which together form a core ring, said sections provided with closed chambers having passages opening radially to the ring sections adjacent their abutting ends for the passage of temperature controlling fluid, means to completely assemble and hold said sections together in ring form, and additional means to connect said passages one with another by radially applied pressure against said openings.

6. A collapsible ring core having chambered sections with passages opening on the inner periphery of the ring and means to connect said sections through such passages comprising a flexible union with a clamping device operable to press the ends of the union into sealing engagement with two adjacent passage openings.

7. A connecting device of the character described comprising a clamp for the application of the device to a core, a flexibly mounted connecting pipe and a power multiplying device for forcing the ends of said pipe into tight joint engagement with corresponding openings in the core.

8. In a collapsible core having chambered sections and spaced openings connecting with said chambers, means to hold the sections in assembled relation, and means actuable after the sections are so held to connect the openings of adjacent sections for the circulation of fluid therethrough.

9. In a collapsible core having chambered sections and spaced openings connecting with said chambers, means to hold the sections in assembled relation, and means actuable after the sections are so held to connect the openings of adjacent sections for the circulation of fluid therethrough, said means including plug and socket devices applied to the openings by pressure.

10. In a collapsible core having chambered sections and spaced openings connecting with said chambers, means to hold the sections in assembled relation, and means actuable after the sections are so held to connect the openings of adjacent sections for the circulation of fluid therethrough, said means including self-adjusting plug and socket devices applied to the openings by pressure.

11. In a collapsible core having chambered sections and spaced openings connecting with said chambers, means to hold the sections in assembled relation, and means actuable after the sections are so held to connect the openings of adjacent sections for the circulation of fluid therethrough, said means including a flexible pipe section and a clamp to hold the ends thereof in tight engagement with said openings.

12. In a collapsible core having chambered sections and spaced openings connecting with said chambers, means to hold the sections in assembled relation, and means actuable after the sections are so held to connect the openings of adjacent sections for the circulation of fluid therethrough, said means including two nipples flexibly mounted in a rigid power applying device and a flexible pipe connecting said nipples whereby the joints between the spaced openings and the means to connect them may be made tight and said means quickly applied and removed.

13. In a collapsible core having chambered sections and spaced openings connecting with said chambers, means to hold the sections in assembled relation, and means actuable after the sections are so held to connect the openings of the adjacent sections for the circulation of fluid therethrough, said means including a connecting pipe located substantially in the central plane of the core and connected to the core at exposed joints along the inner periphery of the core.

14. A fluid connection for adjacent segments of a collapsible core comprising a pair of members pivoted together and having hooked ends for engaging over flanges on the core, a bridge piece, a member having universal connection with said bridge piece and screw threaded engagement with one of the first named members, a pair of nipples movably held in the bridge piece and adapted to form a fluid tight joint with sockets on the core segments, and a connection for fluid between the nipples, all constructed and arranged so that the nipples may be pressed into the sockets in the core segments and may move slightly to compensate for inaccuracies and errors of alignment therein.

15. A connection for fluid for adjacent segments of a collapsible core comprising a bridge piece, means whereby the bridge piece may be pressed towards the core, a pair of nipples carried by the bridge piece and slightly movable with relation thereto, and a fluid connection between the nipples.

16. A fluid connection for adjacent segments of a collapsible core comprising a pair of nipples arranged to form a fluid tight joint with coacting sockets on the core segments, a fluid connection between the nipples, means for pressing the nipples towards the core, and means for equalizing the pressure whereby the nipples will be pressed simultaneously against the sockets.

CHARLES H. DESAUTELS.